May 11, 1943. D. H. HILL ET AL 2,318,777

BROODER CONSTRUCTION FOR CHICKS

Filed Dec. 15, 1941

INVENTORS.
DEWEY H. HILL.
DONALD B. TOLLEY.
BY Lockwood, Goldsmith & Galt,
ATTORNEYS.

Patented May 11, 1943

2,318,777

UNITED STATES PATENT OFFICE 2,318,777

BROODER CONSTRUCTION FOR CHICKS

Dewey H. Hill and Donald B. Tolley, Macomb, Ill., assignors to Globe American Corporation, Kokomo, Ind., a corporation Application December 15, 1941, Serial No. 422,960

3 Claims. (Cl. 219—34)

This invention relates to an electric brooder for chicks, and more particularly to the construction thereof embodying a heat diffusing cone in association with an electric heating element.

In brooders of the character herein disclosed, and particularly wherein an electric heating element is employed, difficulty is experienced in directing the heat generated by the element downwardly and laterally in such fashion as to enable the chicks to receive the maximum benefit and effect thereof. The heating element must of necessity be positioned above the chicks and so arranged that hot spots endangering the chicks are avoided.

It is the object of this invention to provide a device associated with the usual heating element within a brooder which deflects and diffuses the heat to give the chicks therebelow a more even temperature. This is accomplished, wherein a centrally positioned heat generating ring is employed, by securing thereto or in association therewith, a deflecting and diffusing cone, as will be hereinafter more fully set forth and described.

Figure 1:
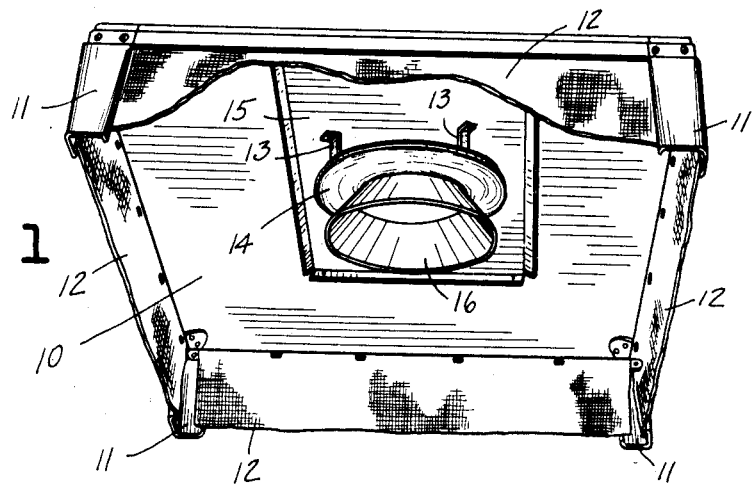
Figure 2:
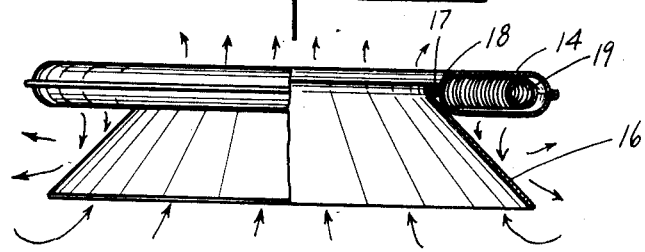
Figure 3:
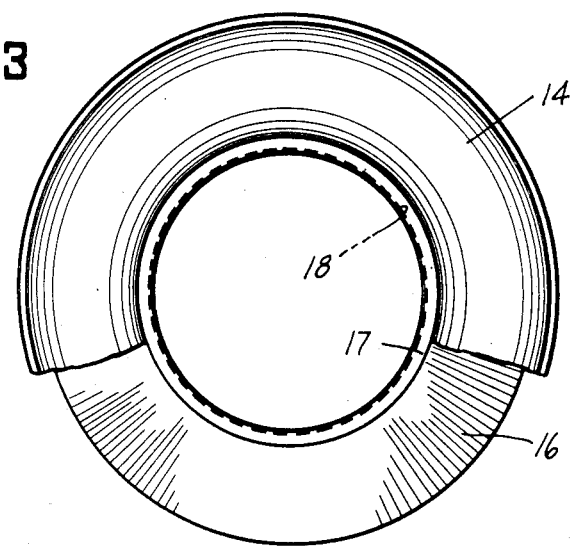

The full nature of the invention will be understood from the accompanying drawing and the following description and claims:

Fig. 1 is a perspective view of a brooder looking at the underside thereof and including the heating element and diffusing cone. Fig. 2 is a plan view of the element with the diffusing cone secured thereto and with a portion thereof shown in central vertical section. Fig. 3 is a plan view looking down on the heating element with a portion thereof broken away to show the cone therebelow.

In the drawing there is illustrated a brooder 10 adapted to be supported by corner legs 11 between which curtains 12 extend. Depending from the top of the brooder and extending downwardly therein supported by brackets 13 there is an annular heating element 14. Associated therewith and immediately above the heating element there is provided a reflecting top of suitable metal indicated at 15 for reflecting the heat rays downwardly.

Secured to the inner periphery of the heat generating ring 14 there is a downwardly extending truncating heat diffusing cone 16. Said cone is preferably made of sheet metal having a reflecting surface and with its upper truncated edge flanged radially at 17 to interlock with the inwardly and radially extending bead 18 formed on the heating ring 14. As to the heating ring 14, a suitable resistance unit 19 may be embodied therein connected in the usual manner with a source of electric current and controlled by a suitable switch and thermostat, not shown.

The diffusing cone extends downwardly toward the floor upon which the brooder rests but with its lower edge spaced therefrom sufficiently to permit free movement or head room for the chicks. The skirt of the cone extends downwardly and outwardly from the inner periphery of the heating element to substantially its outer periphery and at such an angle that its outer reflecting surface intercepts the downwardly directed radiant heat to deflect it substantially laterally. The inner surface of the cone has the effect of providing a flue for gathering and directing upwardly the air currents developed by the heat of the heating element to facilitate air circulation, as indicated by the arrows. The effect of this arrangement is to protect the chicks from direct heat radiation and assist in providing an even temperature within the brooder due to control of the air currents. It further has the effect of increasing the radiating surface and so diffusing the radiant heat as to increase its heating efficiency.

The invention claimed is:

1. An air and radiant heater adapted for suspension from the top portion of a brooder for chicks, comprising a ring-like heating element, means for supporting said element in suspended position, a reflecting surface on said top portion above said element, a deflector in the form of a truncated cone extending downwardly and laterally under said element with an outer reflecting surface spaced from said element and angularly disposed relative thereto to receive and direct outwardly radiant heat therefrom, and means for securing the reduced portion of said deflector within said element with its enlarged portion extending substantially in line with the periphery thereof to provide a downwardly flared flue-like passageway for directing heated air upwardly past the heated area thereof.

2. An air and radiant heater adapted for suspension from the top portion of a brooder for chicks, comprising an electric heating element supported by and depending from the top portion thereof, said heating element being of ring-like form and horizontally positioned with a bead formed about the inner periphery thereof, means for supporting said element in suspended position, and a deflector of truncated conical form having an outwardly formed flange about the restricted portion thereof adapted to engage the said bead to support the deflector in downwardly extending and flaring relation to said element, the flared surface of said deflector extending at an angle below said element in position to receive downwardly directed radiant heat therefrom for lateral reflection and provide a flue for receiving and directing upwardly through said element air currents produced by the generated heat.

3. An air and radiant heater adapted for suspension as a unit from the top portion of a brooder for chicks, comprising an electric heater element of ring-like form, a deflector in the form of a truncated cone extending downwardly and laterally under said element with an outer reflecting surface spaced from said element and angularly disposed relative thereto to receive and direct outwardly radiant heat therefrom, said deflector being open and unobstructed at both ends to provide a flue-like passage for directing heated air upwardly past the heated area thereof, means for securing the upper reduced open end portion of said deflector within said element, and means for supporting said element and deflector as a unit in suspended position.

DONALD B. TOLLEY.
DEWEY H. HILL.